United States Patent
Davis

(10) Patent No.: US 10,185,460 B2
(45) Date of Patent: Jan. 22, 2019

(54) DEVICE NOTIFICATIONS

(71) Applicant: LONGSAND LIMITED, Cambridge (GB)

(72) Inventor: Matthew Davis, London (GB)

(73) Assignee: LONGSAND LIMITED, Cambridge (GB)

(*) Notice: Subject to any disclaimer, the term of this patent is extended or adjusted under 35 U.S.C. 154(b) by 224 days.

(21) Appl. No.: 15/021,805

(22) PCT Filed: Sep. 26, 2013

(86) PCT No.: PCT/EP2013/070107
§ 371 (c)(1),
(2) Date: Mar. 14, 2016

(87) PCT Pub. No.: WO2015/043642
PCT Pub. Date: Apr. 2, 2015

(65) Prior Publication Data
US 2016/0231871 A1    Aug. 11, 2016

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 1/1626* (2013.01); *G06F 3/016* (2013.01);
(Continued)

(58) Field of Classification Search
CPC ..................... G06F 17/30867; G06F 17/30864
See application file for complete search history.

(56) References Cited

U.S. PATENT DOCUMENTS 7,671,756 B2   3/2010   Herz et al.
8,423,090 B2   4/2013   Swaby
(Continued)

FOREIGN PATENT DOCUMENTS

CN   101631162 A   1/2010
CN   102946495 A   2/2013
EP      2432202      3/2012

OTHER PUBLICATIONS

European Patent Office, International Search Report and Written Opinion for PCT/EP2013/070107 dated May 9, 2014 (11 pages).
(Continued)

*Primary Examiner* — William L Bashore
*Assistant Examiner* — Rayeez R Chowdhury

(57) ABSTRACT

Techniques associated with device notifications are described in various implementations. In one example implementation, a method may include receiving, at a mobile computing device, sensor data captured by a non-touchscreen sensor associated with the mobile computing device. The method may also include analyzing the sensor data, using the mobile computing device, to detect a user activation input that corresponds to a request to identify pending notifications on the mobile computing device. The method may also include identifying pending notifications on the mobile computing device that are responsive to the request. The method may also include generating a non-visual notification response that indicates to a user of the mobile computing device, in a non-visual manner, a result of the identification.

14 Claims, 2 Drawing Sheets

(51) Int. Cl.
*G06F 3/01* (2006.01)
*G06F 1/16* (2006.01)
*G06F 3/0488* (2013.01)
*G06F 3/16* (2006.01)

(52) U.S. Cl.
CPC ............ *G06F 3/0488* (2013.01); *G06F 3/167* (2013.01); *G06F 2200/1636* (2013.01)

(56) References Cited

U.S. PATENT DOCUMENTS

| | | | |
|---|---|---|---|
| 2003/0076348 A1* | 4/2003 | Najdenovski | G10H 1/0016 715/727 |
| 2005/0170816 A1* | 8/2005 | Pelaez | H04L 51/38 455/412.2 |
| 2007/0121918 A1* | 5/2007 | Tischer | H04M 1/72572 379/373.02 |
| 2007/0190991 A1* | 8/2007 | Cargille | H04M 19/04 455/415 |
| 2008/0165022 A1* | 7/2008 | Herz | G06F 3/017 340/669 |
| 2009/0146962 A1 | 6/2009 | Ahonen et al. | |
| 2010/0017759 A1* | 1/2010 | Birnbaum | H04W 4/21 715/863 |
| 2010/0022278 A1* | 1/2010 | Swaby | H04M 1/0214 455/567 |
| 2011/0038114 A1 | 2/2011 | Pance et al. | |
| 2011/0054647 A1* | 3/2011 | Chipchase | H04M 3/42127 700/94 |
| 2012/0068835 A1 | 3/2012 | Li | |
| 2012/0105192 A1* | 5/2012 | Norieda | H04M 1/0202 340/1.1 |
| 2012/0218091 A1 | 8/2012 | Rothschild | |
| 2012/0286944 A1 | 11/2012 | Forutanpour et al. | |
| 2013/0057489 A1* | 3/2013 | Morton | G06F 1/169 345/173 |
| 2013/0125020 A1* | 5/2013 | Lee | G06Q 10/10 715/752 |

OTHER PUBLICATIONS

Kaaresoja, T. et al., Perception of Short Tactile Pulses Generated by a Vibration Motor in a Mobile Phone, Proceedings of the First Joint Eurohaptics Conference and Symposium on Haptic Interfaces for Virtual Environment and Teleoperator Systems, Mar. 2005 (2 pages).

* cited by examiner

DEVICE NOTIFICATIONS

BACKGROUND

Personal electronic devices, such as smartphones, tablets, and other similar devices, may use notifications as a way to provide relevant information to users of the devices. Notifications may be used in a variety of contexts to provide, for example, system alerts, missed communication alerts, application-specific alerts, and other appropriate alerts.

DETAILED DESCRIPTION

Figure 1:
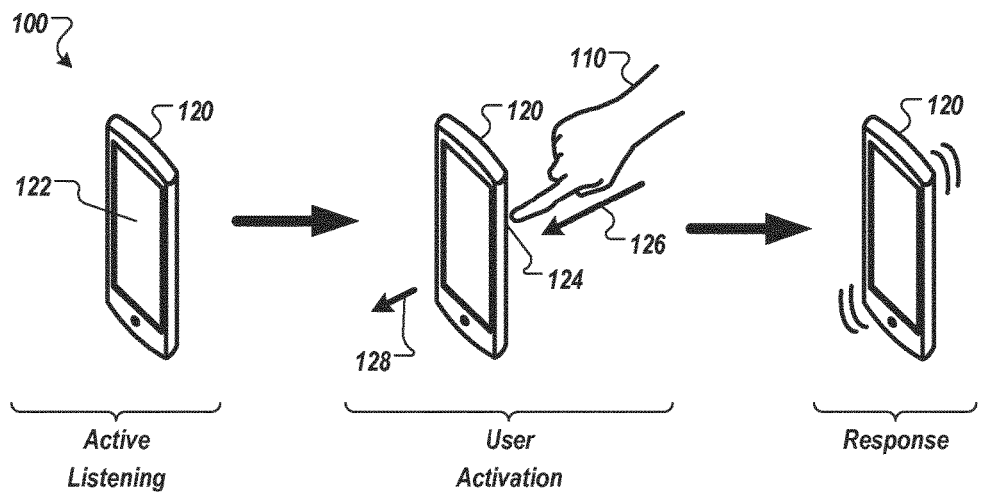
FIG. 1 is a conceptual diagram of an example notification checking process in accordance with implementations described herein.

Notifications are typically presented on a display of an electronic device, often in a specific notification area on the display, such as in a notification panel displayed at the top of the screen. In some cases, such displayed notifications may be persisted, e.g., continuously or repeatedly displayed, until cleared by a user, but the displayed notifications are generally not visible to the user while the display is turned off or while the device is out of the user's line of sight.

In addition to displayed notifications, some devices may also be configured to make an audible noise (e.g., a jingle to indicate an incoming email), and/or to vibrate (e.g., to indicate that a caller has left a voicemail), and/or to use other appropriate mechanisms to alert the user to newly received communications or other notifications. However, such non-visual notifications are often only available for a finite period of time, e.g., often lasting only a few seconds after a notification event occurs, and the non-visual notifications are typically not repeated. As such, to check for pending notifications after the finite period of time has elapsed, a user must typically turn on the display of the device to view the notification panel or other appropriate location where the notifications are persistently displayed.

In some situations, turning on the display to check for pending notifications may be inappropriate or inconvenient. For example, if the user is in a business meeting or eating dinner with friends, it may be inconsiderate for the user to turn his or her attention to the computing device to check for missed voicemail or email messages. Similarly, if the user is in a darkened movie theater, it may be distracting to others in the theater if the user turns on the display of the device. In other situations, such as while driving a car, checking for notifications by turning on and viewing the display may cause significant distraction to the user, and may therefore be dangerous to the user and to others.

Disclosed herein are techniques that allow a user to discretely check for pending notifications on a mobile computing device without turning on a display of the mobile computing device. As used herein, the term "pending notifications" is intended to mean persisted notifications that have not yet been acknowledged or otherwise cleared by the user. Pending notifications may include, for example, system notifications (e.g., low battery, system updates, alarms or timers, etc.), communications notifications (e.g., missed calls, voicemail messages, text messages, etc.), and/or application-specific notifications (e.g., social networking updates, email messages, game updates, etc.), among others. The application-specific notifications may, in some cases, include notifications associated with third party applications that are not natively installed on the mobile computing device.

As described in greater detail below, the user may initiate a check for pending notifications (e.g., by tapping on the mobile computing device in a predetermined pattern), and the mobile computing device may respond with a non-visual response (e.g., using vibrations) to indicate whether pending notifications are present. In some cases, the user may indicate (e.g., based on a specific input pattern) what types of pending notifications are of interest, and/or the non-visual response may indicate how many and/or what types of notifications are pending. Armed with such information, the user may then decide whether to turn on the display to view additional information about the pending notifications. For example, if the user is in a meeting, but has also been waiting on an important alert, the user may discretely check for any pending notifications, and if any are present, the user may briefly step out of the meeting to view the notification.

Such techniques may be used in a variety of different environments (e.g., noisy/quiet, or dark/bright, etc.) without drawing attention to the user, and may also be used with less distraction to the user than turning on the display to check for notifications. The techniques may also be used while the mobile computing device is physically accessible, but outside of the user's line of sight, such as while the device is under a table, or in the user's pocket, or in a bag, for example. The techniques may also be suitable for users who are vision- and/or hearing-impaired. These and other possible benefits and advantages will be apparent from the figures and from the description that follows.

FIG. 1 is a conceptual diagram of an example notification checking process 100 in accordance with implementations described herein. The diagram illustrates three stages of process 100, from left to right, as a user 110 interacts with a mobile computing device 120 to check for pending notifications on the device. Although the mobile computing device 120 shown in FIG. 1 is illustrated as a smartphone device, it should be understood that other mobile computing devices, such as tablets, smart watches, and other appropriate devices (including devices without displays) may be similarly configured to operate according to the techniques described herein.

The example notification checking process 100 may generally include three stages—an Active Listening stage, a User Activation stage, and a Response stage. During the Active Listening stage, one or more non-touchscreen sensors (e.g., motion sensors, microphones, or other appropriate sensors) associated with the mobile computing device 120 may be configured to capture and provide sensor data to the device. During the User Activation stage, the mobile computing device 120 may analyze the sensor data to detect a user activation input, such as a double-tap to the back of the device, corresponding to a request to identify notifications that are pending on the device. When the user activation input is detected, the mobile computing device 120 may identify any pending notifications that are responsive to the request (e.g., all notifications pending on the device, or a particular subset of the pending notifications that satisfy the specific request). During the Response stage, the mobile computing device 120 may generate a non-visual notification response, such as a vibration pattern, that indicates the result of the identification. For example, if no notifications responsive to the request are pending on the mobile computing device 120, the mobile computing device 120 may vibrate once, indicating to the user that the request has been acknowledged, but that no responsive notifications are pending. Or, if pending notifications responsive to the request are pending on the mobile computing device 120, the device may vibrate twice, indicating to the user that notifications are pending.

The notification checking process 100 as described above is an overview of one possible implementation of the process to provide context for the various examples and implementations described in greater detail below. While described as three operational stages, such description is for clarity of presentation only, and it should be understood that certain portions or all of the functionality described as occurring during one stage may be performed during a different stage, and/or certain stages may be performed concurrently with other stages. For example, the sensor data capturing functionality described in association with the Active Listening stage may also or concurrently be performed during the User Activation stage and/or the Response stage.

During the Active Listening stage of process 100, the mobile computing device 120 may be powered on, but a display screen 122, if any, of the mobile computing device 120 may be turned off. In addition, a touchscreen interface, if any, associated with the display screen 122 may be inactive such that any contact made to the display screen may be undetected or otherwise ignored by the touchscreen interface (but not necessarily by other appropriate sensors as described below). In such a state, if the user intentionally or unintentionally makes contact with the display screen 122 and/or touchscreen interface, the contact may not cause any response from the mobile computing device 120. This lack of response may be fairly typical for a mobile computing device 120 while the display screen 122 is turned off as it ensures that the display screen 122 and any associated touchscreen interface are not unintentionally activated by incidental contact. In some cases, the mobile computing device 120 may also be operating in a locked mode that requires the user to unlock the device before activating the full functionality of the device.

During the Active Listening stage, one or more non-touchscreen sensors associated with the mobile computing device 120 may capture and provide sensor data to the device, even while the display is turned off, or while the touchscreen interface is inactive, or while the device is locked, or while the device is otherwise not responsive to other applicable interfaces. Examples of non-touchscreen sensors that may be used in accordance with the techniques described here may include, for example, motion sensors such as accelerometers, gravity sensors, rotational vector sensors, gyroscopes, or other appropriate motion sensors to capture motion data associated with the device. Another example of a non-touchscreen sensor that may be used in some implementations is a microphone, which may be used to capture audible data occurring around the device. Such sensors, and other appropriate sensors, may typically be deactivated while the display is turned off, but according to the techniques described herein, may remain activated to capture appropriate sensor data that may indicate a user's desire to check for notifications while the other user interfaces are inactive.

The sensors may generally be configured to capture sensor data on a continuous or periodic basis, and may similarly be configured to provide such sensor data to a processor of the mobile computing device 120 on a continuous or periodic basis. In various implementations, the periodicity of capturing and/or providing the sensor data may generally be configured in a manner to ensure that enough relevant sensor data is captured, but also in a manner that limits power consumption so that device power may be preserved.

During the User Activation stage of process 100, the received sensor data may be analyzed to detect a user activation input corresponding to a request to identify pending notifications on the mobile computing device 120. Upon detection of the user activation input, the corresponding request may be performed by the device. In the example shown in FIG. 1, the user activation input may be in the form of a user 110 tapping on a body portion 124 of the mobile computing device 120, as indicated by motion arrow 126, which in turn causes the mobile computing device 120 to move, as indicated by motion arrow 128. While shown as a tap to the back panel of mobile computing device 120, it should be understood that taps to other portions of the device, including to the inactivated touchscreen portion of the device, may similarly cause the mobile computing device 120 to move. Such motion of the mobile computing device 120 may be detected, for example, by a motion sensor such as an accelerometer or other appropriate sensor associated with mobile computing device 120. The detected user activation input (e.g., the tap) may correspond to a specific request (e.g., to identify all or certain pending notifications on the device), and the request may be carried out in response to detecting the user activation input.

In some implementations, the user activation input may be in the form of a predetermined pattern of one or more user inputs to the device (e.g., one or more taps, shakes, rotations, or other appropriate inputs or combinations of inputs) that are detectable by a non-touchscreen sensor of the device. For example, the device may be configured to recognize a double-tap to a body portion of the mobile computing device 120 as a user activation input corresponding to a request to check for any notifications pending on the device. In such an implementation, the mobile computing device 120 may analyze the sensor data, e.g., from an accelerometer and/or a microphone, to determine whether the sensor data is consistent with a double-tap action from the user, and if such a double-tap action is received, the corresponding request (e.g., to check for any notifications pending on the device) may be performed. In another example, the device may be configured to recognize a lateral shake and/or a rotational gesture as a user activation input. In such an example, the lateral shake and/or rotational gesture may be detected by one or more motion sensors, such as an accelerometer, a rotational vector sensor, and/or a gyroscope. It should be understand that these and other appropriate user activation input mechanisms and/or other appropriate non-touchscreen sensors may be used to indicate the user's intention to check for pending notifications on the mobile computing device 120.

In some implementations, multiple user activation inputs may be recognized by the mobile computing device 120, each of which may correspond to a particular request to identify certain pending notifications. For example, as described above, a double-tap to the body portion of the device may correspond to a request to check for any pending notifications, while a triple-tap may correspond to a request to check for any pending system notifications (but not other types of pending notifications). Similarly, a rotational twist followed by a single tap may correspond to a request to check for pending notifications associated with a particular application. These examples of user activation inputs corresponding to different requests are for explanatory purposes only, and it should be understood that other user activation inputs and corresponding requests are possible.

The user activation inputs may also include additional information associated with the one or more user inputs, and such additional information may be considered in recognizing more complex patterns. For example, timing information associated with the user inputs may be considered, which may allow the patterns (and corresponding requests) to be based on the number or types of user inputs, as well as the timing (short pauses, long pauses, etc.) between multiple inputs. In the case of user taps as inputs, the taps may be interpreted as a series of "dots" and "dashes". As another example, input location information associated with the user inputs may be considered, which may allow the patterns (and corresponding requests) to be based on a particular region of the device (e.g., front panel, back panel, right edge, left edge, top edge, bottom edge, touchscreen, etc.) at which the inputs were received. Again, in the case of user taps as inputs, taps to an edge of the device may be considered different from taps to the back panel of the device, and may therefore be associated with different notification requests, even if the number and timing of the taps is otherwise the same.

In some implementations, the user activation inputs may be user-configurable, and may include appropriate definable patterns of user inputs that are detectable by a non-touchscreen sensor of the device. For example, the user may define a pattern of taps and pauses to indicate a particular request to check for pending notifications. In such implementations, the user may be provided with an interface listing the various sensors and types of inputs that are recognizable by the device as well as a listing of available requests and/or request types, and the interface may allow the user to map specific inputs and/or patterns to specific corresponding requests.

During the User Activation stage, the mobile computing device 120 may filter or otherwise ignore sensor data that does not correspond to a valid user activation input. For example, if a particular input pattern is received that does not correspond to any defined user activation input, the device may simply return to the Active Listening stage without providing a response. Similarly, sensor data that does not meet a particular threshold (such as a motion threshold, an amplitude threshold, a frequency threshold, a timing threshold, or other appropriate threshold based on the type of sensor data being analyzed) may also be filtered or otherwise ignored. Such filtering may reduce the likelihood of false positives when detecting valid user activation inputs, and may also reduce the amount of sensor data to be further analyzed.

For example, a normal user tap may typically cause a motion sensor to capture movement within a particular range of values, and if the motion sensor captures sensor data that indicates a lower value or a higher value than the particular range, it may safely be ignored as not corresponding to a valid user activation input (e.g., even if the pattern may otherwise match a valid user activation input). A very light bumping or touching of the device, e.g., as measured by the motion sensor, may not reach a minimum motion threshold to be interpreted as being indicative of a valid user input. Similarly, if the user drops the phone onto the floor, the movement may exceed a maximum threshold, and may therefore not be considered as a valid user input. In either instance, the sensor data may either be discarded or otherwise disregarded. Other thresholds and/or threshold ranges (e.g., minimum and/or maximum frequency and/or amplitude measurements associated with a microphone sensor; minimum or maximum pauses between taps; etc.) may similarly be utilized to minimize the effect of false positives and the amount of sensor data to be processed.

Following detection of a valid user activation input and subsequent performance of the corresponding request to identify pending notifications, a non-visual response indicating the results of the identification may be generated in the Response stage. The non-visual response may be in any appropriate form, provided that it indicates to the user, in a non-visual manner, the results of the identification so that the user can ascertain such results without turning on a display of the device. For example, the non-visual response may be in the form of vibrations of a certain pattern, or in the form of audible tones of a certain pattern, or in the form of a voice-based response that announces the results.

The non-visual response may depend on the request, but in general, the response may indicate, for example, whether any pending notifications responsive to the request were identified as being present on the device. For example, the response may provide a binary result of either "yes" or "no", to indicate whether any pending notifications responsive to the request were identified. The binary result may be presented, for example, as a long or short vibration, respectively, or as a double or single vibration, respectively, or by using different frequencies of vibration, or using other appropriate response patterns.

In some implementations, the non-visual response may also or alternatively indicate the number of pending notifications responsive to the request that were identified (e.g., a single, long vibration to indicate that no pending notifications were identified, or a series of short vibrations to indicate the number of pending notifications that were identified). In some implementations, the non-visual response may also or alternatively indicate the type of pending notifications identified. For example, if the request was simply to identify all pending notifications, the response may indicate certain types of pending notifications that were identified, and may also indicate the number of each of the types of pending notifications that were identified (e.g., by using a pattern of vibrations or other non-visual indicators to convey such information).

As with the user activation inputs, the non-visual responses may also be user-configurable in some implementations. For example, the user may define a pattern of vibrations and/or other non-visual indicators to indicate whether responsive pending notifications were identified and/or the number and/or types of pending notifications that were identified. In such implementations, the user may be provided with an interface listing the various types of responses that may be generated by the device as well as a listing of available response indication mechanisms, and the interface may allow the user to map specific types of responses and/or patterns to specific response indications.

Following the Response stage, the device may return to the Active Listening stage, where it may continue until such time as the user 110 once again provides a valid user activation input indicating a request to identify pending notifications.

Figure 2:
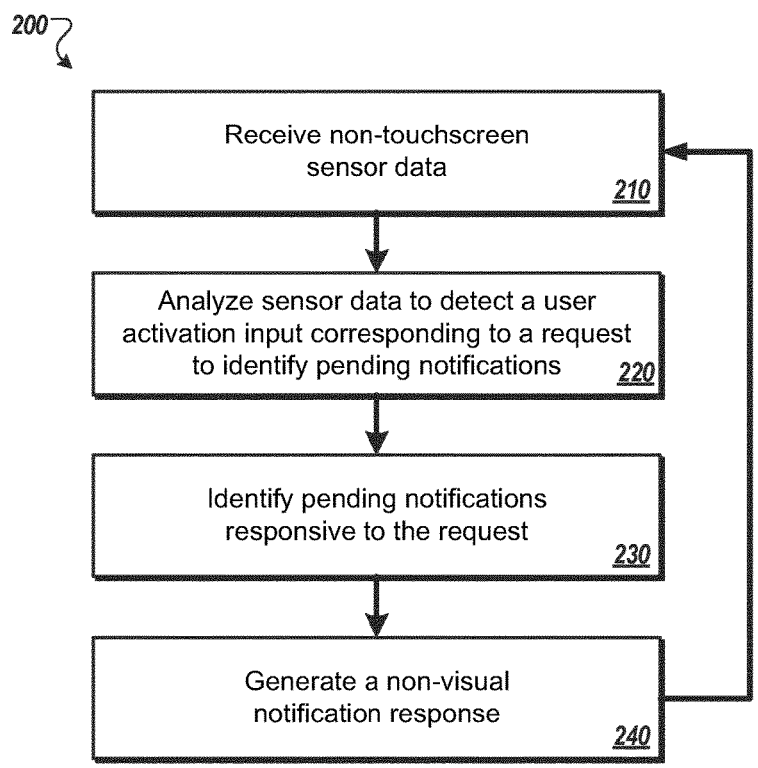
FIG. 2 is a flow diagram of an example notification checking process in accordance with implementations described herein.

FIG. 2 is a flow diagram of an example notification checking process 200 in accordance with implementations described herein. The process 200 may be performed, for example, by a computing device, such as mobile computing device 120 illustrated in FIG. 1. For clarity of presentation, the description that follows uses the mobile computing device 120 illustrated in FIG. 1 as the basis of an example for describing the process. However, it should be understood that another system, or combination of systems, may be used to perform the process or various portions of the process.

Process 200 begins at block 210 when non-touchscreen sensor data is received from a non-touchscreen sensor associated with the mobile computing device. Such non-touchscreen sensor data may be different from input provided by the touchscreen user interface in that the non-touchscreen sensor data can be monitored and captured while the touchscreen is inactive (e.g., when the display is turned off), and/or in devices that do not include a touchscreen interface. Examples of such non-touchscreen sensor data may include motion data captured by one or more motion sensors (e.g., accelerometers, gravity sensors, rotational vector sensors, and/or gyroscopes) and/or audible data captured by one or more microphones. The motion data and/or the audible data may be indicative of one or more physical inputs to the mobile computing device. For example, a sudden movement of an approximate magnitude (or within a range of magnitudes), and/or a sound impulse of a particular frequency, amplitude, and duration, may be indicative of a tap to a body portion of the device. In various implementations, the one or more motion sensors, microphones, or other appropriate sensors may be integrated with the mobile computing device (e.g., built-in, native sensors), or may otherwise be configured to provide external sensor data to the mobile computing device.

At block 220, the sensor data is analyzed to detect a user activation input that corresponds to a request to identify pending notifications on the mobile computing device. The sensor data may be analyzed in accordance with the type of data being provided. For example, motion sensor data may include acceleration forces and/or rotational forces along one or more axes, and such data may be analyzed to detect movements (or patterns of movements) of the mobile computing device. Microphone data may include amplitude and frequency data associated with noises near the mobile computing device, and such data may be analyzed to detect sound impulses (or patterns of sound impulses) occurring near the device.

When the pattern detected in the sensor data (e.g., movement patterns and/or sound impulse patterns) matches a pattern that has been defined as a user activation input, the device may correlate the user activation input to a corresponding request to identify certain notifications pending on the device (e.g., all pending notifications or a subset of the pending notifications), and the request may be carried out at block 230. For example, the device may execute one or more operating system commands or may utilize application programming interfaces (APIs) to query the system for all pending notifications, or for a subset of the pending notifications (e.g., based on the notification type).

In some implementations, the user activation input may include a pattern of physical inputs to the mobile computing device (e.g., taps to the body of the device, or motions made with the device), and the request may be based on the pattern of inputs. In some cases, the pattern of physical inputs may indicate a type of notification available on the device, and the request may be formed to identify pending notifications that are of the particular type indicated in the request. For example, a double-tap physical input may correspond to a request for system notifications and a triple-tap physical input may correspond to a request for communications notifications. In some cases, the pattern of physical inputs may indicate an application stored on the mobile computing device, and the request may be formed to identify pending notifications that are associated with the particular application indicated in the request. For example, a "dot-dash-dot" pattern of taps may correspond to a request for notifications associated with one particular application, and a "dash-dash-dot" pattern of taps may correspond to a request for notifications associated with a different application.

In some implementations, the user activation input may include both a pattern of physical inputs to the mobile computing device as well as respective input locations on the mobile computing device associated with such physical inputs, and the request may be based on the pattern of inputs and their respective input locations. For example, the sensor data may include sufficient information not only to detect physical inputs (such as the occurrence of taps), but may also provide location information indicating where on the device such physical inputs occurred (e.g., the approximate location or a region of the device that was tapped). In such cases, the user activation input of a double-tap to the back panel of the device may be interpreted differently than a double-tap to an edge portion of the device, and may therefore be mapped to a different request to identify pending notifications.

At block 240, a non-visual notification response is generated. The non-visual notification response may indicate to the user, in a non-visual manner, the result of the identification. The result (e.g., whether and/or how many responsive pending notifications were identified, and/or the respective types of such pending notifications) may be communicated in any appropriate non-visual manner, such as through a pattern of one or more vibrations, tones, spoken words, or other appropriate non-visual approaches, or combinations of such approaches.

For example, the response may provide a binary result indicating whether any pending notifications responsive to the request were identified. The binary result may be presented, for example, as a long or short vibration, respectively, or as a double or single vibration, respectively, or by using different frequencies of vibration, or using other appropriate response patterns to distinguish between a "yes" or a "no" result. As another example, the response may also or alternatively indicate the number of pending notifications responsive to the request that were identified. In such cases, the non-visual response may also indicate the respective type(s) of pending notifications being identified as responsive in the result. For example, if the request was simply to identify all pending notifications, the response may indicate certain types of pending notifications that were identified, and may also indicate the number of each of the types of pending notifications that were identified (e.g., by using a pattern of vibrations or other non-visual indicators to convey such information).

Following block 240, the process 200 may be repeated, e.g., until the device is turned off or until the notification checking functionality is deactivated by the user.

Figure 3:
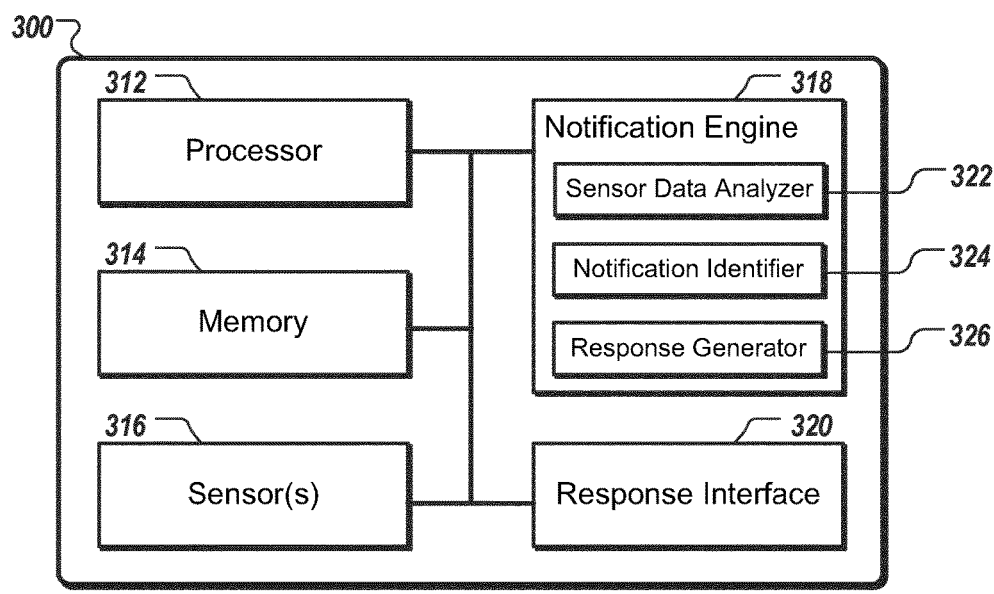
FIG. 3 is a block diagram of an example computing device to provide device notifications in accordance with implementations described herein.

FIG. 3 is a block diagram of an example computing device 300 to provide device notifications in accordance with implementations described herein. Computing device 300 may, in some implementations, be used to perform certain portions or all of the functionality described above with respect to mobile computing device 120 of FIG. 1, and/or to perform certain portions or all of process 200 illustrated in FIG. 2.

Computing device 300 may include a processor 312, a memory 314, one or more sensors 316, a notification engine 318, and a response interface 320. It should be understood that the components shown here are for illustrative purposes, and that in some cases, the functionality being described with respect to a particular component may be performed by one or more different or additional components. Similarly, it should be understood that portions or all of the functionality may be combined into fewer components than are shown.

Processor 312 may be configured to process instructions for execution by computing device 300. The instructions may be stored on a non-transitory, tangible computer-readable storage medium, such as in memory 314 or on a separate storage device (not shown), or on any other type of volatile or non-volatile memory that stores instructions to cause a programmable processor to perform the techniques described herein. Alternatively or additionally, computing device 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The computing device 300 may include one or more associated sensors 316 capable of capturing sensor data. At least one of the one or more associated sensors 316 may be a non-touchscreen sensor, including, for example, one or more motion sensors (e.g., accelerometers, gravity sensors, rotational vector sensors, and/or gyroscopes) to capture motion data associated with the computing device 300 and/or one or more microphones to capture audible data occurring near the computing device 300. Other non-touchscreen sensors may include, for example, orientation sensors and/or environmental sensors. Sensor data captured by the one or more sensors 316 may be provided to the notification engine 318 for processing.

Notification engine 318 may execute on one or more processors, e.g., processor 312, and may be configured to detect, from the captured sensor data, a physical input pattern corresponding to a request to identify pending notifications on the computing device 300. In response to detecting the physical input pattern, the notification engine 318 may identify pending notifications on the computing device 300 that are responsive to the request, and may generate a non-visual notification response that indicates a result of the identification. Notification engine 318 may include components, such as a sensor data analyzer 322, a notification identifier 324, and a response generator 326, to accomplish such functionality.

The sensor data analyzer 322 may be configured to receive the sensor data captured by the one or more sensors 316, and to correlate the sensor data to associated physical input patterns. For example, certain patterns of motion data may be indicative of a tapping input, or a rotational input, or a swinging input, or the like, and the sensor data analyzer 322 may analyze the motion data to detect whether any such inputs are indicated in the motion data. Similarly, certain patterns of audible data may be indicative of a tapping input, or a rotational input, or a swinging input, or the like, and the sensor data analyzer 322 may analyze the audible data to detect whether any such inputs are indicated in the audible data. In some implementations, the sensor data analyzer 322 may perform such analysis by comparing the incoming sensor data to known physical input signatures (e.g., a tapping input may produce a distinct signature that is detectable from the data), and if the sensor data matches any of the known physical input signatures, then the sensor data analyzer 322 may indicate a detection of the type of physical input that was matched.

The notification identifier 324 may be configured to correlate the detected physical input pattern with a corresponding request to identify pending notifications on the computing device 300, and to identify any pending notifications on the computing device 300 that are responsive to the request. In some implementations, the notification identifier 324 may maintain a mapping of physical input patterns to specific notification identification requests such that, when a particular physical input pattern is detected, the corresponding request may be performed.

To carry out the corresponding request to identify pending notifications (e.g., to identify all pending notifications or some specific subset of the pending notifications), the notification identifier 324 may execute one or more operating system commands or may utilize application programming interfaces (APIs) to query the system as appropriate. In various implementations, the pending notifications may be stored in memory 314 or on a separate storage device (not shown), and the notification identifier 324 may query the system to identify the pending notifications that are responsive to the request.

The response generator 326 may process the one or more results of the request to generate a non-visual notification response that indicates a result of the identification. In some implementations, the non-visual notification response may include an indication of whether pending notifications that are responsive to the request are present on the computing device 300 (e.g., a binary result). In other implementations, the non-visual notification response may include an indication of how many pending notifications that are responsive to the request are present on the computing device 300 (e.g., a count-based result). In other implementations, other appropriate notification responses are possible.

In some cases, the response generator 326 may generate the non-visual notification response based on the pending notification result(s) as obtained by the notification identifier 324. In other cases, the operating system commands and/or available APIs may not allow for fine-grained (e.g., type- and/or application-specific) notification results, and the response generator 326 may, in such cases, process the results such that they are responsive to the request before generating the notification response.

Response interface 320 may be implemented in hardware and/or software, and may be configured, for example, to provide to a user of the computing device 300, in a non-visual manner, the non-visual notification response. In various implementations, response interface 320 may include, for example, a vibration motor to cause the computing device 300 to vibrate in a particular pattern indicative of the identification result, or a speaker and tone generator to cause the computing device 300 to output an audible tone pattern indicative of the identification result, or a speaker and a voice generator to cause the computing device 300 to output a spoken announcement in accordance with the identification result. Response interface 320 may also utilize other appropriate output devices, output techniques, and/or combinations of such devices and/or techniques to provide the non-visual notification response.

Figure 4:
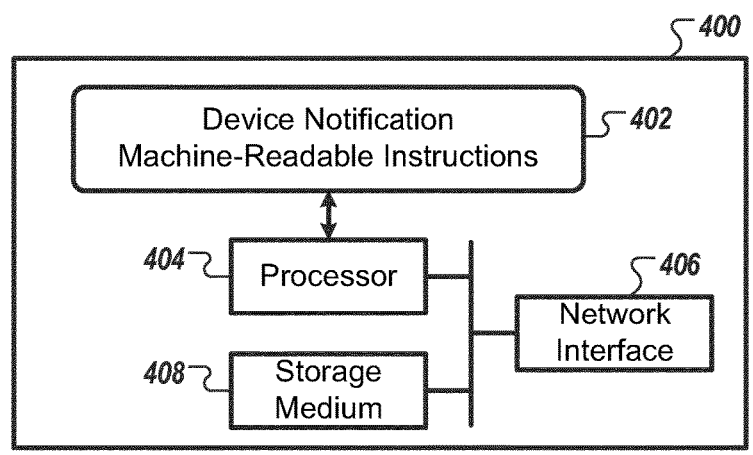
FIG. 4 is a block diagram of an example computer system to perform notification checking in accordance with implementations described herein.

FIG. 4 is a block diagram of an example computer system 400 to perform notification checking in accordance with implementations described herein. The system 400 includes device notification machine-readable instructions 402, which may include certain of the various modules of the computing devices depicted in FIGS. 1 and 3. The device notification machine-readable instructions 402 may be loaded for execution on a processor 404 or on multiple processors. In some implementations, the instructions 402, when executed by one or more processors, may cause the one or more processors to receive sensor data captured by a non-touchscreen sensor associated with a computing device; to analyze the sensor data to detect a physical input corresponding to a request to identify pending notifications on the computing device; to identify pending notifications on the computing device that are responsive to the request; and to generate a non-visual notification response that indicates to a user of the computing device, in a non-visual manner, a result of the identification.

As used herein, a processor may include a microprocessor, microcontroller, processor module or subsystem, programmable integrated circuit, programmable gate array, or another control or computing device. The processor(s) 404 may be coupled to a network interface 406 (to allow the system 400 to perform communications over a data network) and/or to a storage medium (or storage media) 408.

The storage medium 408 may be implemented as one or multiple computer-readable or machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; optical media such as compact disks (CDs) or digital video disks (DVDs); or other appropriate types of storage devices.

Note that the instructions discussed above may be provided on one computer-readable or machine-readable storage medium, or alternatively, may be provided on multiple computer-readable or machine-readable storage media (e.g., in a distributed system having plural nodes). Such computer-readable or machine-readable storage media are considered to be part of an article (or article of manufacture). An article or article of manufacture may refer to any appropriate manufactured component or multiple components. The storage medium or media may be located either in the machine running the machine-readable instructions, or located at a remote site, e.g., from which the machine-readable instructions may be downloaded over a network for execution.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method comprising:
   receiving, at a mobile computing device, sensor data captured by a non-touchscreen sensor associated with the mobile computing device;
   analyzing the sensor data, by a processor of the mobile computing device, to detect a user activation input that corresponds to a request to determine whether there are pending notifications on the mobile computing device, wherein the user activation input comprises a pattern of physical inputs to the mobile computing device, wherein the request is based on the pattern of physical inputs, wherein the pattern of physical inputs indicates a type of notification available on the mobile computing device, and wherein the request is to identify pending notifications that are of the type;
   in response to the request, determining, by the processor, whether there are pending notifications on the mobile computing device;
   in response to a determination that there is at least one pending notification, outputting, by the processor, a first non-visual notification response that indicates there is at least one pending notification on the mobile computing device; and
   in response to a determination that there are no pending notifications, outputting, by the processor, a second non-visual notification response that indicates there are no pending notifications on the mobile computing device.

2. The method of claim 1, wherein the pattern of physical inputs indicates an application stored on the mobile computing device, and wherein the request is to identify pending notifications associated with the application.

3. The method of claim 1, wherein the user activation input further comprises input locations on the mobile computing device associated with the physical inputs, and wherein the request is based on the pattern of physical inputs and their respective input locations.

4. The method of claim 1, wherein the first non-visual notification response comprises a first number of vibrates to indicate there is at least one pending notification on the mobile computing device and the second non-visual notification response comprises a second number of vibrates to indicate there are no pending notifications present on the mobile computing device.

5. The method of claim 1, wherein the first non-visual notification response comprises an indication of how many pending notifications that are present on the mobile computing device.

6. The method of claim 5, wherein the first non-visual notification response further comprises respective types of the pending notifications being indicated.

7. The method of claim 1, wherein the non-touchscreen sensor associated with the mobile computing device comprises a motion sensor that captures motion indicative of physical inputs to the mobile computing device.

8. The method of claim 1 wherein the non-touchscreen sensor associated with the mobile computing device comprises a microphone that captures sounds indicative of physical inputs to the mobile computing device.

9. A computing device comprising:
   a processor;
   a non-touchscreen sensor to capture sensor data;
   a memory storing instructions that when executed cause the processor to:
      detect, from the captured sensor data, a user activation input comprising a physical input pattern corresponding to a request to determine whether there are pending notifications on the computing device, wherein the request is based on the physical input pattern, wherein the physical input pattern indicates a type of notification available on the computing device, and wherein the request is to identify pending notifications that are of the type,
      in response to detecting the physical input pattern corresponding to the request, determine whether there are pending notifications on the computing device, in response to a determination that there is at least one pending notification, output a first non-visual notification response that indicates there is at least one pending notification on the computing device, and in response to a determination that there are no pending notifications, output a second non-visual notification response that indicates there are no pending notifications on the computing device; and a response interface to provide to a user of the computing device, in a non-visual manner, the first or second non-visual notification response.

10. The computing device of claim 9, wherein the physical input pattern comprises a pattern of taps to a body portion of the computing device, and wherein the request is based on the pattern of taps.

11. The computing device of claim 9, wherein the first non-visual notification response comprises a first number of vibrates to indicate there is at least one pending notification on the computing device and the second non-visual notification response comprises a second number of vibrates to indicate there are no pending notifications present on the computing device.

12. The computing device of claim 9, wherein the first non-visual notification response comprises an indication of how many pending notifications that are present on the computing device.

13. A non-transitory computer-readable storage medium storing instructions that, when executed by a processor, cause the processor to:

receive sensor data captured by a non-touchscreen sensor associated with a computing device;

analyze the sensor data to detect a user activation input comprising a physical input pattern corresponding to a request to determine whether there are pending notifications on the computing device, wherein the request is based on the physical input pattern, wherein the physical input pattern indicates a type of notification available on the computing device, and wherein the request is to identify pending notifications that are of the type;

in response to detecting the physical input pattern corresponding to the request, determine whether there are pending notifications on the computing device;

in response to a determination that there is at least one pending notification, output a first non-visual notification response that indicates there is at least one pending notification on the computing device; and in response to a determination that there are no pending notifications, output a second non-visual notification response that indicates there are no pending notifications on the computing device.

14. The non-transitory computer-readable storage medium of claim 13, wherein the first non-visual notification response comprises a first number of vibrates to indicate there is at least one pending notification on the computing device and the second non-visual notification response comprises a second number of vibrates to indicate there are no pending notifications present on the computing device.

* * * * *